United States Patent
Lyman et al.

(10) Patent No.: US 9,879,959 B2
(45) Date of Patent: Jan. 30, 2018

(54) SHAPE MEMORY ALLOY MICRO-AERO CONTROL SURFACES

(71) Applicant: Raytheon Company, Waltham, MA (US)

(72) Inventors: Ward D. Lyman, Tucson, AZ (US); Frederick B. Koehler, Tucson, AZ (US); Terry M. Sanderson, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 379 days.

(21) Appl. No.: 14/057,876

(22) Filed: Oct. 18, 2013

(65) Prior Publication Data

US 2015/0108268 A1    Apr. 23, 2015

(51) Int. Cl.
*F42B 15/01*    (2006.01)
*F42B 10/64*    (2006.01)
(Continued)

(52) U.S. Cl.
CPC ............... *F42B 10/64* (2013.01); *B64C 9/36* (2013.01); *F42B 10/62* (2013.01)

(58) Field of Classification Search
CPC .......... F42B 10/62; F42B 10/64; F42B 10/16; F42B 15/01; F42B 10/06; F42B 15/10;
(Continued)

(56) References Cited

U.S. PATENT DOCUMENTS 6,131,853 A    10/2000    Bauer et al.
6,502,785 B1 *    1/2003    Teter ................. F42B 10/64
                                                      244/3.22

(Continued)

FOREIGN PATENT DOCUMENTS

EP    0 814 019 A2    12/1997
EP    0814019    12/1997

OTHER PUBLICATIONS

International Search Report and Written Opinion corresponding to International Patent Application PCT/US2014/040208 dated Feb. 12, 2015.

(Continued)

*Primary Examiner* — Matthieu F Setliff
*Assistant Examiner* — George Andonyan
(74) *Attorney, Agent, or Firm* — Renner, Otto, Boisselle & Sklar, LLP.

(57) ABSTRACT

A control system for a missile includes a plurality of control surfaces that can be arrayed across a surface of the missile body, and a controller connected to the control surfaces to selectively move the control surfaces between an aerodynamic stowed position where the control surfaces conform to the surface of the body, and a deployed control position removed from the aerodynamic stowed position where the control surfaces extend from the surface of the body to interact with airflow over the body. The control surfaces are made of a material that includes a shape-memory alloy. Heating the control surfaces causes the shape-memory alloy to move the control surfaces from the aerodynamic stowed position to the deployed control position. By selectively extending and retracting the control surfaces, the control system provides the ability to control the missile's direction of travel or to reduce roll about a longitudinal axis of the body.

12 Claims, 4 Drawing Sheets

(51) Int. Cl.
*F42B 10/62* (2006.01)
*B64C 9/36* (2006.01)

(58) Field of Classification Search
CPC ... B64C 2201/102; B64C 3/56; B64C 11/003; B64C 37/00
USPC ........................................................ 244/3.27
See application file for complete search history.

(56) References Cited

U.S. PATENT DOCUMENTS

| | | | |
|---|---|---|---|
| 7,216,831 B2 | 5/2007 | Wood | |
| 7,578,483 B1 | 8/2009 | Cheung et al. | |
| 8,058,595 B2* | 11/2011 | Koehler et al. | 244/3.1 |
| 8,262,032 B2* | 9/2012 | Sanderson et al. | 244/219 |
| 8,528,863 B2* | 9/2013 | Sanderson et al. | 244/123.5 |
| 2008/0265102 A1 | 10/2008 | Larssen et al. | |
| 2009/0206192 A1* | 8/2009 | Sanderson et al. | 244/3.27 |
| 2010/0288870 A1* | 11/2010 | Geswender et al. | 244/3.27 |
| 2013/0099050 A1* | 4/2013 | Sanderson et al. | 244/49 |

OTHER PUBLICATIONS

International Preliminary Report on Patentablility dated Apr. 19, 2016 for corresponding PCT application PCT/US2014/040208.

* cited by examiner

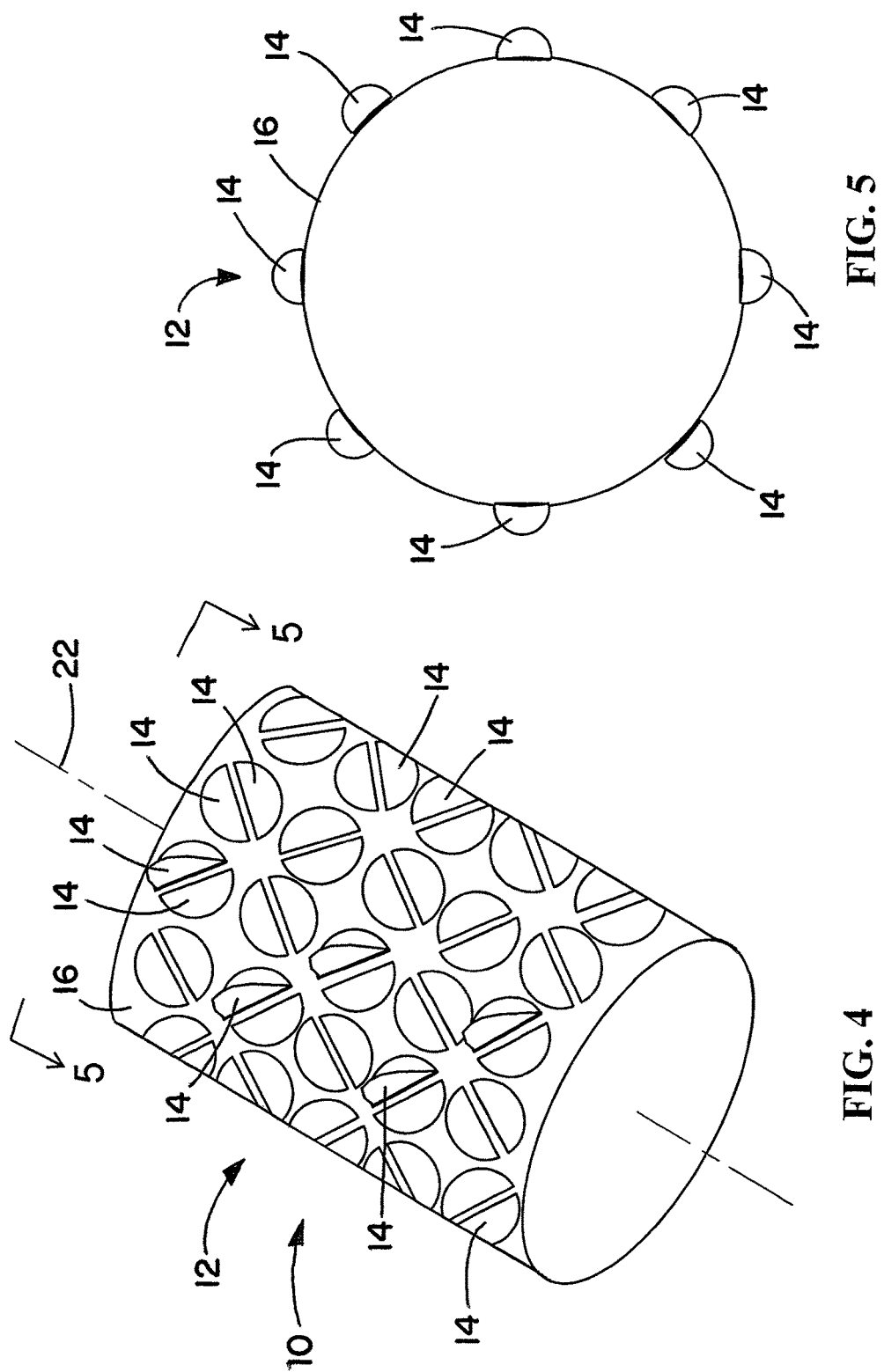

SHAPE MEMORY ALLOY MICRO-AERO CONTROL SURFACES

FIELD OF THE INVENTION

The present invention is related to missile technology, and particularly to aeronautical control surfaces for a missile or other vehicle and a method of using such control surfaces.

BACKGROUND

An axial-thrust powered vehicle, such as a missile, generally has a body with an aerodynamic shape. That means that the body typically is designed to allow air to flow past the body with as little effect as possible. The flight path of the vehicle can be controlled by changing the direction of the exhaust, usually by controlling the orientation of a nozzle, or by controlling the flow of air over adjustable aerodynamic surfaces extending from the body of the vehicle. A single articulated nozzle can control pitch and yaw, but cannot control roll, the spinning motion of the body about its longitudinal axis. As a result, to control roll the vehicle must include multiple nozzles or aerodynamic control surfaces. Aerodynamic control surfaces, such as wings or fins, extend from the body of the vehicle and are rotatable to interact with the air flowing around the body to effect the flight of the vehicle.

SUMMARY

While aerodynamic control surfaces that extend from the body of a missile or other vehicle can be used to control the flight of the vehicle, such surfaces also introduce additional drag forces from friction with the air, even when not being used to alter the vehicle's flight path. Some such control surfaces can be retracted into the body of the vehicle, but that requires additional mechanisms and takes up volume within the body of the vehicle.

The present invention uses small retractable aerodynamic control surfaces to control the flight of a vehicle in a less space-consuming manner than traditional retractable aerodynamic control surfaces. Specifically, the present invention uses aerodynamic control surfaces made of a shape-memory alloy. An array of small control surfaces are coordinated selectively to extend from the surface of the body or to lay flat and conform to the surface of the body. The surface of the body generally is curved, and it should be understood that the control surfaces can conform to the shape of the surface against which the control surface lies.

Heating the shape-memory alloy activates the control surface to move away from the surface of the body and to extend into the airflow around the body, thereby inducing force into the body and controlling its direction of travel or reducing roll. To provide sufficient surface area to control the vehicle, a plurality of small surfaces can be employed. By using a plurality of small surfaces rather than one or a few larger surfaces, the shape memory material can be made relatively thin, which also allows the material to heat faster, decreasing the response time. The forces impinging on the deployed control surface also can be used to reset the shape of the shape memory alloy and return it to a state where it conforms to the surface of the body once heating is no longer being applied. Also, the control surfaces can be arranged such that the forces of the impinging flow stream can be used to reset the shape once heating is no longer being applied.

The control surfaces provided by the invention are applicable to any object moving in a fluid, such as air or water. So although aspects of the invention will be described in aeronautical terms, the control surfaces also can be used to control movement of vehicles in other fluids, such as a torpedo moving through water. As used in this document, the term "vehicle" generally applies to any object, whether powered or otherwise launched, and without regard to the method of its movement, as it moves through the air or any other fluid, particularly water. Accordingly, any use of the term "aerodynamic" and related aeronautical terms generally can be replaced with "hydrodynamic" and related water-based terms throughout the description. Exemplary vehicles include, but are not limited to rockets, missiles, planes, helicopters, projectiles of all types, torpedoes, boats, submarines, etc.

More particularly, the present invention provides a control system for a vehicle having a generally cylindrical body. The control system includes a plurality of control surfaces mounted on or arrayed across a surface of the body. The control surfaces are selectively movable between an aerodynamic stowed position where the control surfaces conform to the surface of the body, and a deployed control position removed from the aerodynamic stowed position where the control surfaces extend from the surface of the body to interact with airflow over the body. The control system also includes a controller that selectively controls the position of the control surfaces.

The control system includes one or more of the following features: (a) the control surfaces are made of a shape-memory alloy; (b) movement of the control surfaces is effected by a heating device, such as an electrical heating device that employs electrical resistance heating using the shape-memory material as a resistor; (c) the control surfaces are generally planar; (d) a subset of the plurality of control surfaces can be moved simultaneously; (e) the plurality of control surface are arranged in at least two different orientations; (f) a spring associated with each control surface biases the control surface to the aerodynamic stowed position; (g) an electrical power supply is connected to the controller; and (h) the control surfaces have a semi-circular shape, and are hingedly mounted adjacent a diameter of the semi-circle.

The control system also can be provided in combination with a vehicle, such as a missile, having a generally cylindrical body, where each of the plurality of control surfaces is hingedly mounted to the body along a hinge line. Accordingly, the body has a longitudinal axis, and the hinge line for each control surface extends in a direction transverse the longitudinal axis of the body.

The present invention also provides a method for controlling a vehicle. The method includes the step of selectively heating one or more of a plurality of control surfaces made of a shape-memory alloy to cause the control surfaces to move from an aerodynamic stowed position conformed to the surface of a body of the vehicle to a deployed control position extending from the surface of the body.

Additionally, the present invention provides a method of varying surface roughness. The method includes the steps of (a) providing an array of control surfaces mounted on a mounting surface and selectively movable between a stowed position conformal to the mounting surface and a deployed position removed from the stowed position where the control surfaces extend from the mounting surface, where the control surfaces include a shape memory material, and (b) controlling the temperature of the shape memory material to selectively move the control surfaces between the stowed position and the deployed position.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

BRIEF DESCRIPTION OF THE DRAWINGS

FIG. 4 is a schematic perspective view of the portion of the body of FIG. 2, with some of the control surfaces activated to extend from the surface of the body to interact with airflow over the body.

FIG. 5 is a schematic cross-sectional view of FIG. 4 as seen along lines 5-5.

DETAILED DESCRIPTION

Figure 1:
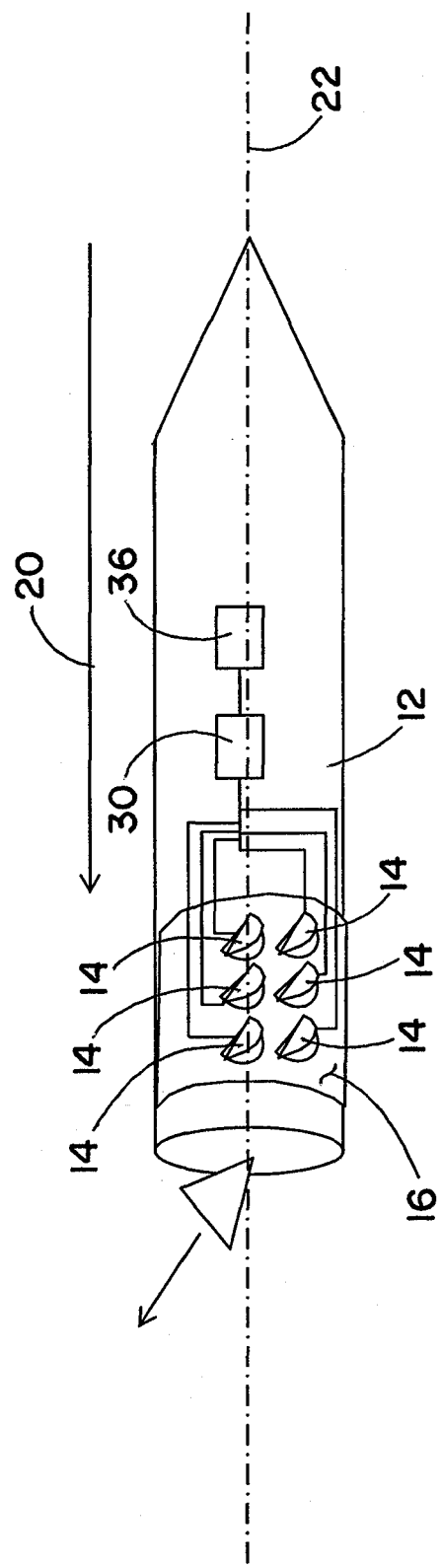
FIG. 1 is a schematic view of a vehicle provided by the invention.

Turning now to the drawings, and initially FIG. 1, the present invention provides a control system 10 for an axial-thrust powered vehicle 12, such as a missile, that includes a plurality of small, retractable, aerodynamic control surfaces 14 to control the flight of the vehicle 12 in a less space-consuming manner than traditional retractable aerodynamic control surfaces. To accomplish this feat, the control surfaces 14 are made of a material that includes a shape-memory alloy. The control system 10 selectively controls the temperature of the control surfaces 14 to cause them to extend from a surface 16 of a body 18 of the vehicle 12 or to lay flat and conform to the surface 16 of the body 18. Although the surface 16 of the vehicle body 18 often is curved, as shown in FIG. 1, and although the control surfaces 14 generally are planar, the control surfaces 14 are relatively thin and generally can conform to the shape of the surface 16 against which the control surface 14 lies, presenting a more aerodynamic profile without occupying a significant volume inside the vehicle 12.

As the control surfaces 14 include a shape-memory alloy, heating the control surfaces 14 causes the shape-memory alloy to change shape. Thus heating a control surface 14 above the transition temperature of the shape-memory alloy activates the shape-memory alloy. Once activated, the shape-memory alloy causes the control surface 14 to move from an aerodynamic stowed or rest position generally parallel to the surface 16 of the body 18 (see FIGS. 2 and 3), for example, to a deployed control position where the control surface 14 extends from the surface 16 of the body 18 (as shown in FIGS. 4 and 5).

During flight, control surfaces 14 in the deployed control position (FIGS. 4 and 5) extend into the path of airflow 20 around the vehicle 12, thereby inducing force into the body 18 of the vehicle 12. By selectively extending and retracting the control surfaces 14, the control system 10 provides the ability to control the vehicle's direction of travel or to reduce roll about a longitudinal axis 22 of the body 18. Using an array of control surfaces 14 having more than one orientation, where control surfaces 14 can be selectively activated, allows for better control.

Figure 3:
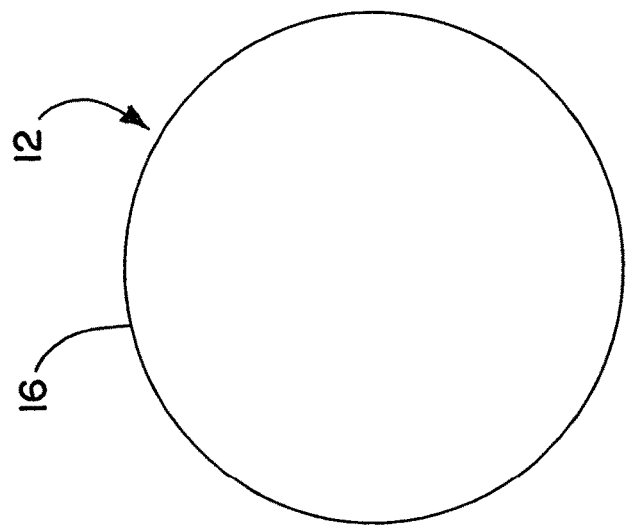
FIG. 3 is a schematic cross-sectional view of FIG. 2 as seen along lines 3-3.
Figure 2:
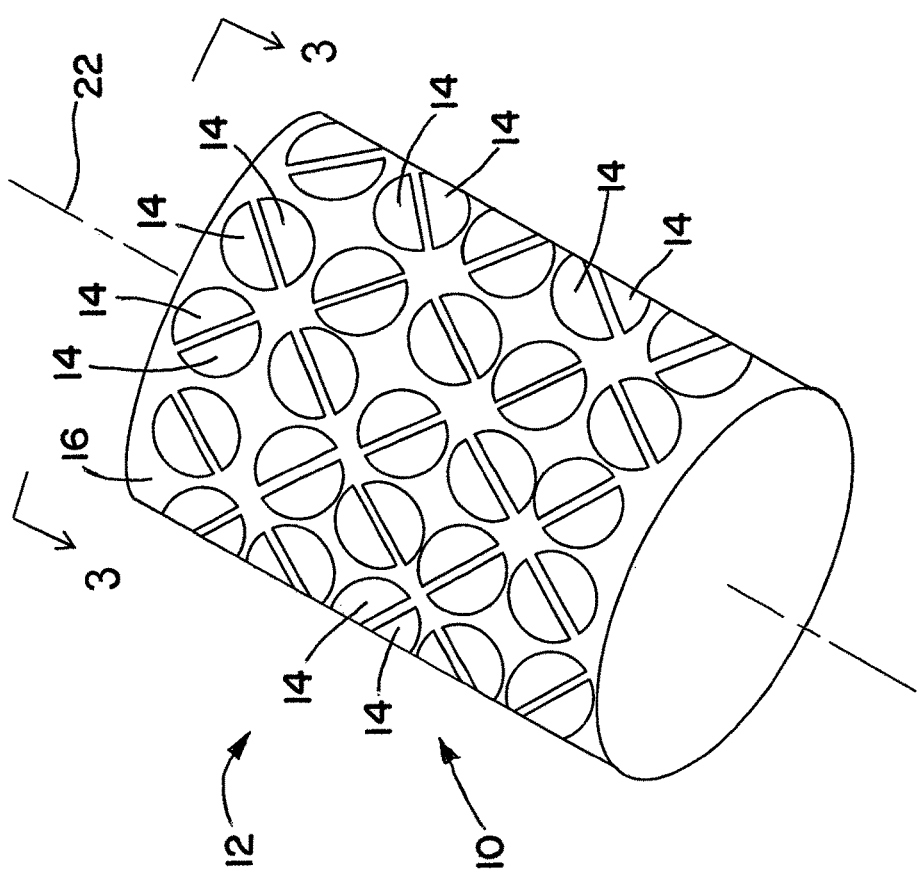
FIG. 2 is a schematic perspective view of a portion of the vehicle body with a plurality of control surfaces conformal with the surface of the body.

Once the heat is withdrawn, the control surfaces 14 will cool and return to their conformal state in the aerodynamic stowed position (FIGS. 2 and 3). Airflow over the body 18 also can provide convective cooling to quickly cool the control surfaces 14 once heat is no longer being applied. The aeronautical forces impinging on the deployed control surface 14 also can be used to reset the shape of the shape memory alloy and return the control surface 14 to a state where it conforms to the surface 16 of the body 18 and the aerodynamic stowed position (FIGS. 2 and 3) as the control surface 14 cools.

Accordingly, the present invention provides a control system 10 for a vehicle 12 having a generally cylindrical body 18. The body 18 thus has a longitudinal axis, which generally aligns with the vehicle's direction of travel or flight path. The control system 10 includes a plurality of control surfaces 14 that can be mounted on or arrayed across a surface 16 of the body 18 or other mounting surface, where the control surfaces 14 are selectively movable between an aerodynamic stowed position where the control surfaces conform to the surface of the body 18 (FIGS. 2 and 3), and a deployed control position removed from the aerodynamic stowed position where the control surfaces 14 extend from the surface 16 of the body 18 (FIGS. 4 and 5) to interact with airflow 20 over the body 18. To effect that control, the control system 10 further includes a controller 30 in communication with each control surface 14 to selectively control the position of the control surfaces 14.

Figure 6:
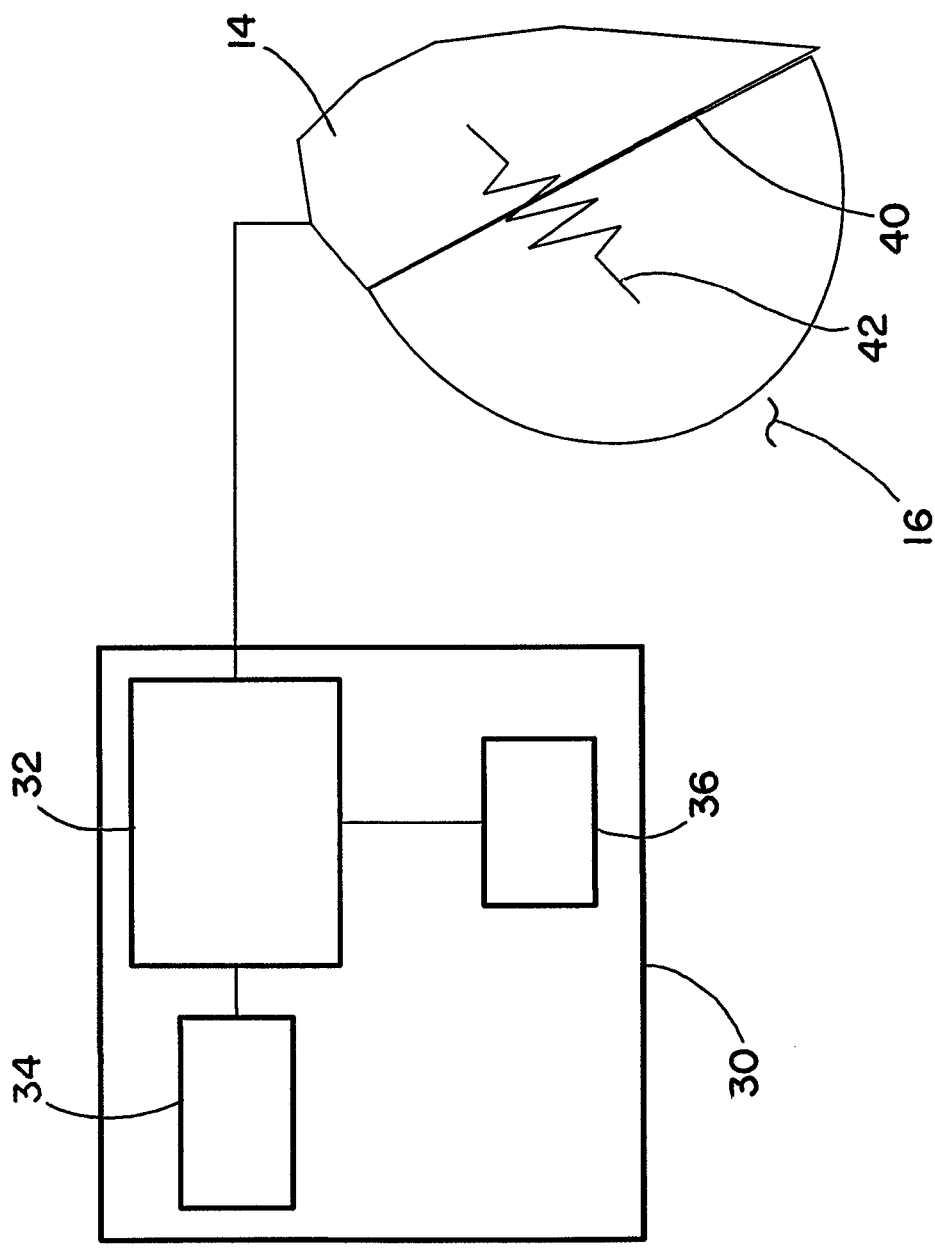
FIG. 6 is an enlarged schematic view of a control surface of FIG. 4.

As shown in FIG. 6, the controller 30 includes a processor 32, such as a microprocessor; a data storage device or memory 34; and associated software to selectively control the delivery of heat from a heating device (not shown), which is coupled to a power supply 36 and to each control surface 14. The power supply 36 can be an integral part of the controller 30, as shown in FIG. 6, or a separate component, as shown in FIG. 1. An exemplary power supply 36 includes a battery. An exemplary heating device can include an electrical resistance heater, a fluid transfer device, a chemical-reaction heat source, etc. The controller 30 can control individual control surfaces 14, or a subset of the plurality of control surfaces 14, as shown in FIG. 4.

The control system 10 provided by the invention uses a plurality of small control surfaces 14 rather than one or a few larger surfaces. This allows the shape memory material for each control surface 14 to be made relatively thin, which also allows the material to heat and cool faster, decreasing the response time. The control surfaces 14 can be arranged on the surface 16 of the body 12 such that the forces of the impinging flow stream also help to reset the position of the control surfaces 14 once heating is no longer being applied.

The small shape-memory alloy control surfaces 14, which also can be referred to as finlets, typically are generally planar and have a major dimension of approximately 0.5 cm to approximately 3 cm. A corresponding recess in the surface of the body 18 may be provided to receive the control surface 14 in its stowed position to improve the aerodynamics of the surface 16 of the vehicle 12. An exemplary missile body 18 has a diameter of about 6 cm. In the aerodynamic stowed position then, where the control surfaces 14 generally conform to the adjacent surface 16, the control surfaces 14 take on a curved shape that corresponds to the curvature of the adjacent surface 16 of the body 18. The control surfaces 14 are placed in a pattern and in sufficient number that they can control a given vehicle 12, such as by controlling roll of the vehicle 12, rotation of the body 18 around its longitudinal axis 22.

The illustrated control surfaces 14 have semi-circular shapes, with a chord 40 (FIG. 6) forming a straight edge where the control surface 14 is hingedly mounted to the surface 16 of the body 18. This straight edge 40, or hinge line, generally extends in a direction transverse the longitudinal axis 22 of the body 18 but not orthogonal to the longitudinal axis 22, thereby providing the ability to interact with the airflow 20 passing thereby. Other shapes may be used—the control surface 14 shape is not limited to the illustrated semi-circular shape.

To provide more control, for example to control roll in both clockwise and counterclockwise directions, the pattern of control surfaces 14 includes hinge lines 40 arranged in at least two different orientations, and may include both positive and negative angles relative to the longitudinal axis 22 of the body 18. The illustrated pattern is but one possibility; the present invention is not limited to the illustrated pattern.

An exemplary means for heating the shape-memory alloy in the control surfaces 14 includes a heating device (not shown), such as a heating device that uses electrical resistance heating to heat the control surfaces 14. An exemplary heating device uses the electrical resistance of the shape-memory alloy itself to generate the heat. The current flow to each control surface 14 is controlled by the controller 30. As shown in FIG. 6, when current is applied, the shape-memory alloy control surface 14 is heated, the control surface 14 is activated, and it moves from the aerodynamic stowed position to the extended or deployed control position as shown. The small size of the control surface 14 allows the control surface 14 to move from the aerodynamic stowed position to the deployed control position in tenths of a second after the electric heating is applied. The shape-memory alloy remains deployed in the control position until the controller 30 stops sending current to that control surface 14. When the current is removed, convection airflow over the control surface 14 often will cool it quickly, whereupon the control surface 14 will return to its aerodynamic stowed position relatively quickly. Insulation or a protective shield can be employed on one or both sides of the control surface 14 to slow the rate of cooling or increase heating efficiency. Additionally, a protective layer or shield can be provided on one or more sides of the control surfaces 14 for protection from debris or to strengthen the control surface 14 when it is deployed in the deployed control position. Thus a relatively thin shape-memory alloy can be used to control a much larger surface. As noted above, aerodynamic forces can contribute to urging the control surface 14 into its stowed position. To help return the control surface 14 to its stowed position, a spring 42 also can be provided, as shown, to bias the control surface 14 toward the aerodynamic stowed position.

The control system 10 thus described can be employed in any situation where airflow control is desired, including rockets or missiles, as shown here, but also including artillery shells, bullets, or any other projectile, or aircraft trim tabs or other aircraft control surfaces. The control system 10 provided by the present invention can be an integral part of the projectile's or aircraft's original manufacture, or it can be separately constructed and provided as part of a kit for retrofitting or working in combination with separately manufactured projectiles or aircraft.

Additionally, the present invention provides aquatic control systems and objects that operate on similar principles for hydrodynamic movement in water. Accordingly, the term "airflow" as it is used herein includes any fluid flow, such as the flow of water around an object moving through the water. In this example, "aerodynamic" and similar aeronautical terms generally can be replaced with equivalent terms in other fluid contexts. Thus the control surfaces also can be employed to effect control of submarines, torpedoes, and aquatic robots, for example.

The control system 10 provided by the invention also can be used in a context where it is advantageous to vary the resistance of fluid flow over a surface, effectively changing the surface roughness by deploying or stowing an array of control surfaces 14 or selected control surfaces 14 in an array. An airfoil provides one potential application where it is desirable to control the transition between laminar flow and turbulent flow over the airfoil. While increased surface roughness created by deploying control surfaces increases drag, it also generates turbulent flow that maintains contact with the airfoil at lower speeds. In some situations the increased drag is beneficial, such as when landing an airplane.

The present invention also provides a method of controlling aerodynamic flight of a vehicle 12, including the step of heating at least one of a plurality of control surfaces 14 having a shape memory material to move the at least one control surface 14 from an aerodynamic stowed position to an extended or deployed control position removed from the aerodynamic stowed position.

In summary, the present invention provides a control system 10 for a vehicle 12, such as a missile, that includes a plurality of control surfaces 14 that can be arrayed across a surface 16 of the missile body 18, and a controller 30 connected to the control surfaces 14 to selectively move the control surfaces 14 between an aerodynamic stowed position where the control surfaces 14 conform to the surface 16 of the body 18 (FIGS. 2 and 3), and a deployed control position removed from the aerodynamic stowed position where the control surfaces 14 extend from the surface 16 of the body 18 (FIGS. 4 and 5) to interact with airflow 20 over the body 18. The control surfaces 14 are made of a material that includes a shape-memory alloy. Heating the control surfaces 14 causes the shape-memory alloy to move the control surfaces 14 from the aerodynamic stowed position to the deployed control position. By selectively extending and retracting the control surfaces 14, the control system 10 provides the ability to control the missile's direction of travel or to reduce roll about a longitudinal axis 22 of the missile body 18.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. An aerodynamic vehicle comprising:
 a cylindrical body with a longitudinal axis and a an outer continuous surface; and
 a control system having:
  a plurality of control surfaces arrayed across the outer surface of the body, wherein the arrayed plurality of control surfaces includes an array of at least four control surfaces, where the plurality of control surfaces are selectively movable between an aerodynamic stowed position where the plurality of control surfaces conform to and are parallel to the surface of the body, and
  a deployed control position removed from the aerodynamic stowed position where the plurality of control surfaces extend from the surface of the body to interact with an airflow over the body; and
  a controller that selectively controls the position of the plurality of control surfaces;
 where the plurality of control surfaces are made of a shape-memory alloy and movement of the plurality of control surfaces is effected by a heating device that heats the shape-memory alloy;
 where the plurality of control surfaces are arranged in at least two different orientations relative to each other and arranged in corresponding positive and negative angles relative to the longitudinal axis of the body;
 where each of the plurality of control surfaces are hingedly mounted to the body and the movement of each of the plurality of control surfaces is about a hinge line being in a direction transverse to the longitudinal axis of the cylindrical body and non-orthogonal to the longitudinal axis of the cylindrical body.

2. An aerodynamic vehicle as set forth in claim 1, where the heating device includes an electrical-resistance heater that uses electrical resistance to generate heat.

3. An aerodynamic vehicle as set forth in claim 2, where the shape-memory alloy is connected to a source of electricity and provides electrical resistance in the electrical heating device.

4. An aerodynamic vehicle as set forth in claim 1, where the control surfaces are planar.

5. An aerodynamic vehicle as set forth in claim 1, where a subset of the plurality of control surfaces can be moved simultaneously.

6. An aerodynamic vehicle as set forth in claim 1, comprising a spring associated with each control surface that biases the control surface to the aerodynamic stowed position.

7. An aerodynamic vehicle as set forth in claim 1, comprising an electrical power supply connected to the controller.

8. An aerodynamic vehicle as set forth in claim 1, where the control surfaces have a semi-circular shape, and are hingedly mounted adjacent a diameter of the semi-circle.

9. An aerodynamic vehicle as set forth in claim 8, where the control surfaces have a major dimension of between 0.5 cm and 3 cm.

10. An aerodynamic vehicle as set forth in claim 9, where the body has a diameter of 6 cm.

11. An aerodynamic vehicle as set forth in claim 1, where each of the plurality of control surfaces is hingedly mounted to the body along the hinge line.

12. An aerodynamic vehicle as set forth in claim 11, where the hinge line for each control surface extends in a direction transverse to the longitudinal axis of the body.

* * * * *